United States Patent
S et al.

(10) Patent No.: US 10,762,793 B2
(45) Date of Patent: Sep. 1, 2020

(54) SYSTEMS AND METHODS FOR SELECTING ACCURATE RUNWAY RECORDS FOR USE IN COCKPIT DISPLAY SYSTEMS

(71) Applicant: HONEYWELL INTERNATIONAL INC., Morris Plains, NJ (US)

(72) Inventors: Anoop S, Karnataka (IN); Mohammed Ibrahim Mohideen, Karnataka (IN); Naveen Bansal, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 47 days.

(21) Appl. No.: 16/101,678

(22) Filed: Aug. 13, 2018

(65) Prior Publication Data
US 2020/0051442 A1  Feb. 13, 2020

(51) Int. Cl.
*G08G 5/00* (2006.01)
*G06F 16/29* (2019.01)
*G08G 5/02* (2006.01)

(52) U.S. Cl.
CPC ........... *G08G 5/0021* (2013.01); *G06F 16/29* (2019.01); *G08G 5/0013* (2013.01); *G08G 5/025* (2013.01)

(58) Field of Classification Search
USPC ........................................................ 701/17
See application file for complete search history.

(56) References Cited

U.S. PATENT DOCUMENTS

| | | | | |
|---|---|---|---|---|
| 4,586,049 A | * | 4/1986 | Davidson | G01S 1/14 342/414 |
| 6,304,800 B1 | * | 10/2001 | Ishihara | G08G 5/0086 340/947 |
| 6,711,479 B1 | | 3/2004 | Staggs | |
| 7,155,427 B1 | * | 12/2006 | Prothia | G06F 16/284 707/694 |
| 7,627,550 B1 | * | 12/2009 | Adams | G06F 16/24556 |
| 7,852,236 B2 | | 12/2010 | Feyereisen et al. | |
| 8,532,849 B1 | | 9/2013 | Tsai | |
| 9,098,999 B2 | | 8/2015 | Snow et al. | |
| 9,916,765 B2 | | 3/2018 | Ishihara et al. | |
| 2015/0127196 A1 | | 5/2015 | Ishihara et al. | |

(Continued)

FOREIGN PATENT DOCUMENTS

EP  0938645 A1  9/1999
EP  3166093 A1  5/2017

*Primary Examiner* — James M McPherson
(74) *Attorney, Agent, or Firm* — Lorenz & Kopf, LLP

(57) ABSTRACT

Systems and methods for selecting a runway record for a target runway are provided. The system includes: a first database having a first runway record with a first runway threshold; a second database having a second runway record with a second runway threshold; a transceiver for receiving an ILS signal; and a computer system. The computer system is configured to determine when the ILS signal is substantially zero. When the ILS signal is substantially zero, the computer system is configured to receive, from one or more databases, a plurality of runway records including corresponding runway thresholds; and select a most accurate runway record from the plurality of runway records based, at least in part, on which of the corresponding runway thresholds deviates least from the aiming point. In various embodiments, the most accurate runway record is then utilized for rendering images in a cockpit display system.

20 Claims, 4 Drawing Sheets

(56) References Cited

U.S. PATENT DOCUMENTS

2016/0282120 A1* 9/2016 Wang ................. G01C 23/00
2018/0120850 A1* 5/2018 McLees ............... G05D 1/0202
2018/0238708 A1* 8/2018 He ..................... G01C 23/005

* cited by examiner

SYSTEMS AND METHODS FOR SELECTING ACCURATE RUNWAY RECORDS FOR USE IN COCKPIT DISPLAY SYSTEMS

TECHNICAL FIELD

The technical field generally relates to aircraft display systems, and more particularly relates to selecting accurate runway records for use in cockpit display systems.

BACKGROUND

Cockpit display systems often reference multiple different databases in the course of rendering images that include airport features. Non-limiting examples of the referenced databases include a navigation database (NavDB), a runway awareness and advisory system (RAAS), and an Aerodrome Mapping Database (AMDB). With respect to rendering an image of a target runway, runway information referred to as a "runway record" for the target runway is retrieved from available databases. A runway record includes runway-specific information, and one item of that information is a location of the runway threshold, referred to as the runway threshold location. Ideally, regardless of the number of available databases referenced and regardless of the number of received runway records, the runway threshold locations are the same. In practice, for a given runway, the runway threshold locations provided by different runway records may vary. For some airports, there are significant differences between the runway threshold locations within the runway records sourced from the different databases.

A technical problem is presented because the cockpit display system may not be able to determine, for a given runway, that deviations are present, nor which is the most accurate runway record when more than one runway record is available. When an inaccurate runway record is used in a Synthetic Vision System (SVS), the pilot can see a difference between the rendered SVS runway image (i.e., the displayed runway on the cockpit display system) and the actual runway, (i.e., the target runway viewed out of the window). The difference between the SVS runway and actual runway may be distracting to a pilot. Seeing this difference may also have an undesirable consequence of causing the pilot to lose confidence in the SVS generally.

Accordingly, improved cockpit display systems and methods capable of evaluating runway records for accuracy are desirable. The desirable system for selecting accurate runway records determines, from among the multiple different databases, which is providing the most accurate runway record for use in the cockpit display system. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a first embodiment, a system for selecting a runway record for use in a cockpit display system is provided. The system includes: a first database having a first runway record for a target runway, the first runway record having a first runway threshold; a second database having a second runway record for the target runway, the second runway record having a second runway threshold; a transceiver for receiving an ILS signal; and a computer system operationally coupled to the first database, the second database, and the transceiver, the computer system configured to: process the ILS signal to determine when the ILS signal is substantially zero; and when the ILS signal is substantially zero, identify an aiming point on the target runway; receive the first runway record and the second runway record; select a most accurate runway record from the first and second runway records by determining which of the runway thresholds deviates least from the aiming point; and utilize the most accurate runway record in the cockpit display system.

Also provided is a method for selecting a runway record for a target runway. The method includes: at a computer system onboard an aircraft, receiving an ILS signal; processing the ILS signal to determine when the ILS signal is substantially zero; and when the ILS signal is substantially zero, identify an aiming point on a target runway; receiving from one or more databases, a plurality of runway records including corresponding runway thresholds; and selecting a most accurate runway record from the plurality of runway records based, at least in part, on which of the corresponding runway thresholds deviates least from the aiming point.

An aircraft is provided. The aircraft includes: a transceiver for receiving an ILS signal; and a computer system operationally coupled to the transceiver, the computer system configured to: process the ILS signal to determine when the ILS signal is substantially zero; and when the ILS signal is substantially zero, identify an aiming point on the target runway; receive, from one or more databases, a plurality of runway records including corresponding runway thresholds; and select a most accurate runway record from the plurality of runway records based, at least in part, on which of the corresponding runway thresholds deviates least from the aiming point.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

Exemplary embodiments of the novel disclosed system for selecting accurate runway records (FIG. 1, 102) are provided. The disclosed system for selecting accurate runway records 102 provides a technical solution to the technical problem of mismatches between the actual observed runway and the rendered SVS runway images based on runway records sourced from various databases. Exemplary embodiments of the disclosed system identify, from among the multiple different runway records, a most accurate runway record for a given runway. In some embodiments, the most accurate runway record is utilized in rendering a SVS runway image of the target runway on a cockpit display. The figures and descriptions below provide more detail.

Figure 1:
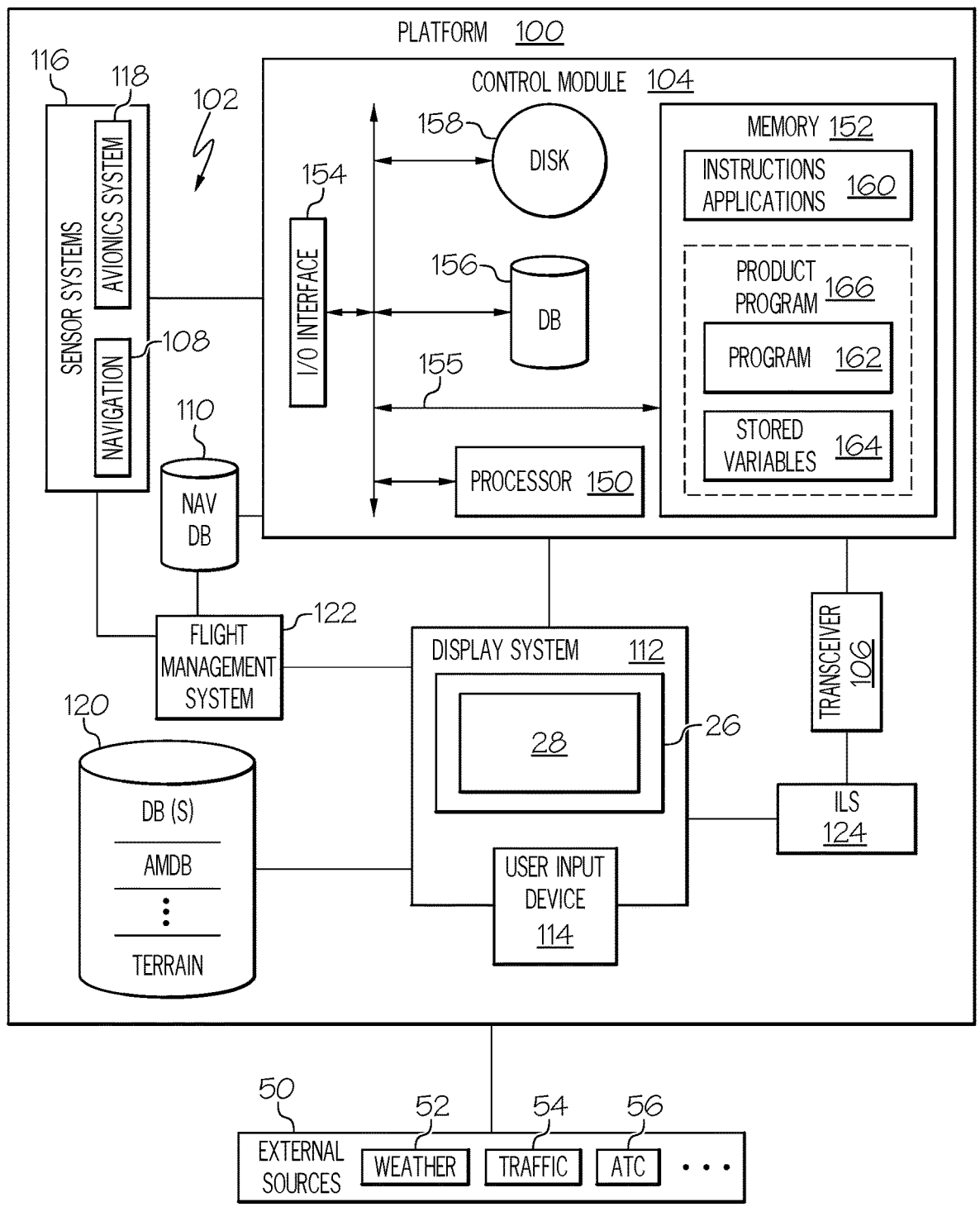
FIG. 1 is a block diagram of a system for selecting accurate runway records for cockpit display systems, in accordance with an exemplary embodiment.

Turning now to FIG. 1, in an embodiment, the system for selecting accurate runway records 102 (also referred to herein as "system" 102) is generally located in a mobile platform 100. In various embodiments, the mobile platform 100 is an aircraft, and is referred to as aircraft 100. The system 102 embodies a control module 104. In some embodiments, the control module 104 may be integrated within a preexisting mobile platform management system, avionics system, cockpit display system (CDS), flight controls system (FCS), or aircraft flight management system (FMS 122). Although the control module 104 is shown as an independent functional block, onboard the aircraft 100, optionally, it may exist in an optional electronic flight bag (EFB). In embodiments in which the control module is within an EFB, the display system 112 and user input device 114 may also be part of the EFB. Further, in some embodiments, the control module 104 may reside in a portable electronic device (PED) such as a tablet, cellular phone, or the like.

The control module 104 may be operatively coupled to any combination of the following aircraft systems: a source of real-time aircraft status data, such as a navigation system 108; a source of prescribed flight plan data, such as a navigation database (NavDB 110); an instrument landing system (ILS 124); and, a display system 112. In various embodiments, the control module 104 is additionally operationally coupled to one or more of: a transceiver 106; a user input device 114; one or more databases 120; a flight management system (FMS 122); and one or more avionics systems sensors 118. The functions of these aircraft systems, and their interaction, are described in more detail below.

Real-time aircraft status data may include any of: an instantaneous position (e.g., the latitude, longitude, orientation), a flight path angle, a vertical speed, a ground speed, an instantaneous altitude (or height above ground level), an instantaneous heading of the aircraft 100 (i.e., the direction the aircraft is traveling in relative to some reference), and a current phase of flight. As used herein, "real-time" is interchangeable with current and instantaneous. In some embodiments, the real-time aircraft status data is generated by the navigation system 108, which is a sensor system shown within a sensor system functional block, sensor system(s) 116. The data provided by the navigation system 108 is referred to as navigation data (also referred to herein as the real-time aircraft status data). The navigation system 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 122, as will be appreciated in the art. The real-time aircraft status data is made available such that the display system 112, the transceiver 106, and the control module 104, may further process and/or handle the aircraft status data.

Prescribed flight plan (FP) data may include a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). A source of a prescribed flight plan data may be a storage location or a user input device. In various embodiments, the NavDB 110 is the source of a prescribed flight plan. The navigation database (NavDB 110) is a storage location that may also maintain a database of flight plans, and/or information regarding terrain and airports and/or other potential landing locations (or destinations) for the aircraft 100. In operation, the navigation system 108 and the NavDB 110 may be integrated with a FMS 122.

Figure 2:
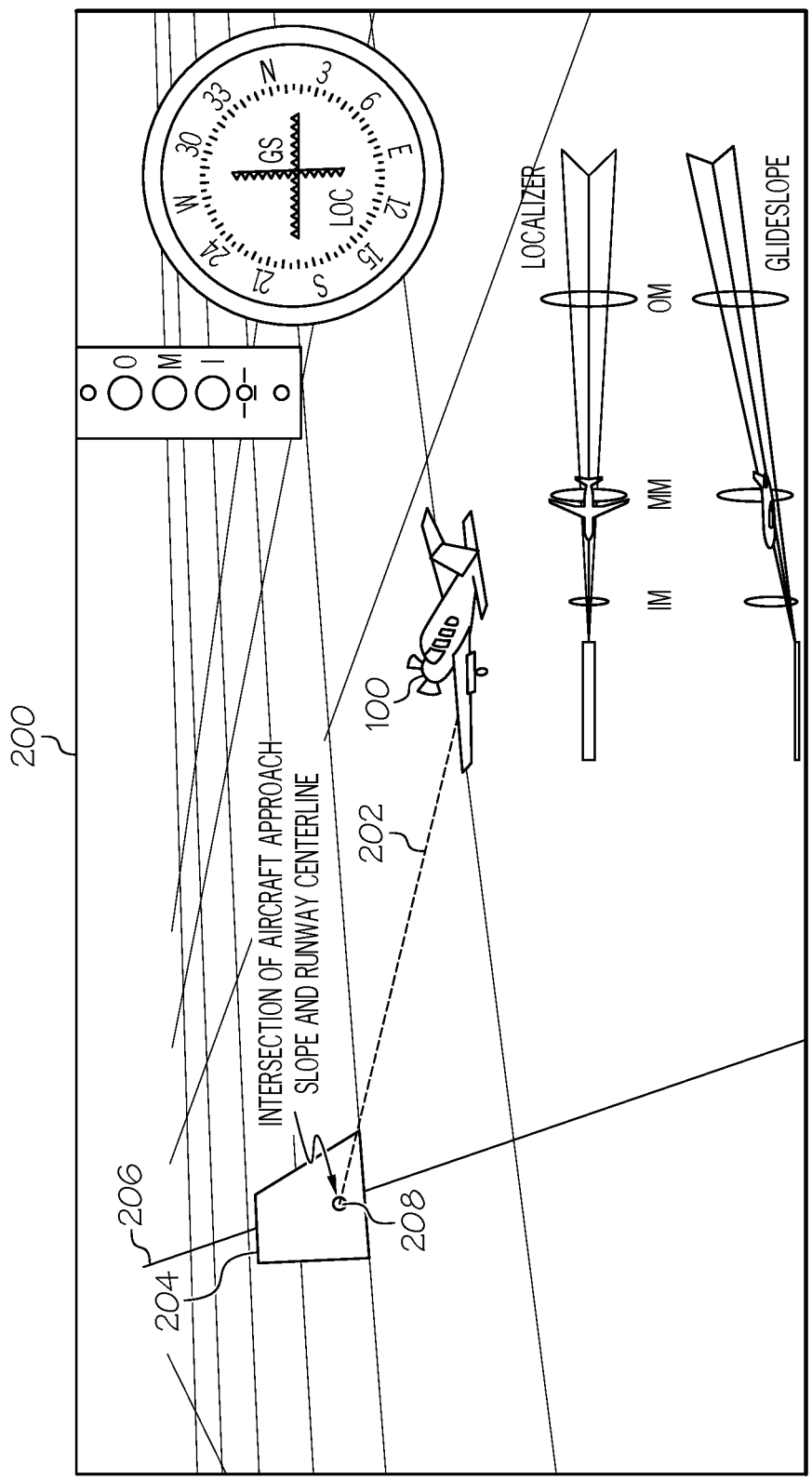
FIG. 2 is an illustration showing an intersection of an ILS signal and a runway centerline of a target runway, in accordance with an exemplary embodiment.

The ILS 124 is a navigation aid that may be used in landing during low visibility. An ILS signal comprises one or more radio signals generated by external sources 50 that are associated with a target runway (FIG. 2, 204). The components of the ILS signal may include a localizer and a glideslope. The ILS signal provides vertical and horizontal guidance and the combined horizontal and vertical guidance may be processed by the ILS 124 to construct a recommended aircraft approach slope 202 from an aircraft 100 current location down to the landing zone of the target runway 204.

Another component of the sensor system(s) 116 is the avionics system(s) 118. In various embodiments, the avionics system(s) 118 provide aircraft performance data and sensed data for a variety of aircraft 100 subsystems. Examples of the aircraft performance data include: engine thrust level, fuel level, flap configuration, braking status, temperature control system status, and the like. As may be appreciated, the avionics system(s) 118 may therefore include a variety of on-board detection sensors, and, as part of the sensor systems 116, may be operationally coupled to the FMS 122.

In various embodiments, the FMS 122, in cooperation with the sensor systems 116, the NavDB 110, and the ILS 124, provides real-time flight guidance for aircraft 100. The FMS 122 is configured to compare the instantaneous position and heading of the aircraft 100 with the prescribed flight plan data for the aircraft 100. To this end, in various embodiments, the NavDB 110 supports the FMS 122 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 122 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 122 may be a source for the real-time aircraft status data of the aircraft 100.

The display system 112 is configured to continuously receive and process the real-time aircraft status data, prescribed flight plan data, and ILS signals, when present. The display system 112 includes a display device 26 for presenting an image 28. In various embodiments described herein, the display system 112 includes a synthetic vision system (SVS), and the image 28 is a SVS image. In some embodiments, the display system 112 formats and renders information received from the FMS 122, as well as external sources 50. In other embodiments, the display system 112 may directly receive and process input from an air data heading reference system (AHRS), an inertial reference system (IRS), the navigation system 108, and the external sources 50. The control module 104 and the display system 112 are cooperatively configured to generate the commands ("display commands") for the display device 26 to render thereon the image 28, comprising various graphical user interface elements, tables, menus, buttons, and pictorial images, as described herein. In exemplary embodiments, the display device 26 is realized on one or more electronic display devices configured as any combination of: a head up display (HUD), an alphanumeric display, a vertical situation display (VSD) and a lateral navigation display (ND). The display device 26 is responsive to display commands from the control module 104 and/or display system 112.

Renderings on the display system 112 may be processed by a graphics system, components of which may be integrated into the display system 112 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 is said to display various images and selectable options described herein. In practice, this may mean that the control module 104 generates display commands, and, responsive to receiving the display commands from the control module 104, the display system 112 displays, renders, or otherwise visually conveys on the display device 26, the graphical images associated with operation of the aircraft 100, and specifically, the graphical images as described herein.

The user input device 114 and the control module 104 are cooperatively configured to allow a user (e.g., a pilot, co-pilot, or crew member) to interact with display devices in the display system 112 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used to for a pilot to accept a runway change or to request a runway change.

In various embodiments, any combination of the FMS 122, user input device 114, and transceiver 106, may be coupled to the display system 112 such that the display system 112 may additionally generate or render, on a display device 26, real-time information associated with respective aircraft 100 components. Configured in this manner, the FMS 122 and transceiver 106 provide navigation information to support navigation, flight planning, and other aircraft control functions in a conventional manner, as well as to provide real-time data and/or information regarding the operational status of the aircraft 100 to the control module 104. In some embodiments, the user input device 114, FMS 122, and display system 112 are configured as a control display unit (CDU).

External sources 50 communicate with the aircraft 100, generally by way of transceiver 106. External sources include: weather and surface data sources (weather 52), such as a source for meteorological terminal aviation weather reports (METARS), automatic terminal information service (ATIS), datalink ATIS (D-ATIS), automatic surface observing system (ASOS); traffic data system(s) 54; air traffic control (ATC) 56; and a variety of other radio inputs, such as the source(s) of the radio signals used by the ILS 124. The traffic data system(s) 120 include numerous systems for providing real-time neighbor/relevant traffic data and information. For example, traffic data sources 54 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification. Information received from external sources may be processed as one or more information layers (for example, a weather layer, a traffic layer, and the like) and layers may be selectively overlaid on an existing image 28.

The transceiver 106 is configured to support instantaneous (i.e., real time or current) communications between the aircraft 100 and the one or more external data source(s) 50. As a functional block, the transceiver 106 represents one or more transmitters, receivers, and the supporting communications hardware and software required for the system 102 to communicate with the various external data source(s) 50 as described herein. In an example, the transceiver 106 supports bidirectional pilot-to-ATC (air traffic control) communications via a datalink. In addition to supporting the data link system, the transceiver 106 is configured to include or support an automatic dependent surveillance broadcast system (ADS-B), a communication management function (CMF) uplink, a terminal wireless local area network (LAN) unit (TWLU), the ILS 124, and any other suitable radio communication system that supports communications between the aircraft 100 and the various external source(s) 50. In this regard, the transceiver 106 may allow the aircraft 100 to receive information that would otherwise be unavailable to the pilot and/or co-pilot using only the onboard systems.

In various embodiments, the control module 104 is additionally operationally coupled to one or more databases 120. The databases 120 may include one or more of: a runway awareness and advisory system (RAAS) database and an Aerodrome Mapping Database (AMDB). In various embodiments, each of these may include an airport features database, having therein maps and geometries, including runway records with corresponding runway threshold locations. The AMDB may also include airport status data for the runways and/or taxi paths at the airport; the airport status data indicating operational status and directional information for the taxi paths (or portions thereof). In some embodiments, the databases 120 may include a terrain database, having therein topographical information for the airport and surrounding environment.

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external data source 50 during an initialization step of a process; it may also be programmed via a user input device 114. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, cause the control module 104 to perform the functions, techniques, and processing tasks associated with the operation of the system 102. Novel program 162 and associated stored variables 164 may be stored in a functional form on computer readable media, for example, as depicted, in memory 152. While the depicted exemplary embodiment is described in the context of a fully functioning computer system, those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In executing the process described herein, the processor 150 specifically loads the instructions embodied in the program 162, thereby being programmed with program 162. During execution of program 162, the processor 150 and the memory 152 form a novel dynamic readouts processing engine that performs the processing activities of the system 102.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the transceiver 106. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 156. In one embodiment, the I/O interface 154 is integrated with the transceiver 106 and obtains data from external data source(s) directly.

The database 156 may include an aircraft-specific parameters database (comprising aircraft-specific parameters and configuration data for aircraft 100, as well as for a variety of other aircrafts) and parameters and instructions for processing user inputs and rendering images 28 on the display device 26, as described herein. In some embodiments, the database 156 is part of the memory 152. In various embodiments, the database 156 and the database 120 are integrated, either within the control module 104 or external to it. Accordingly, in some embodiments, the airport features and terrain features are pre-loaded and internal to the control module 104. Another form of storage media that may be included in, and utilized by, the control module 104 is an optional hard disk 158.

Figure 3:
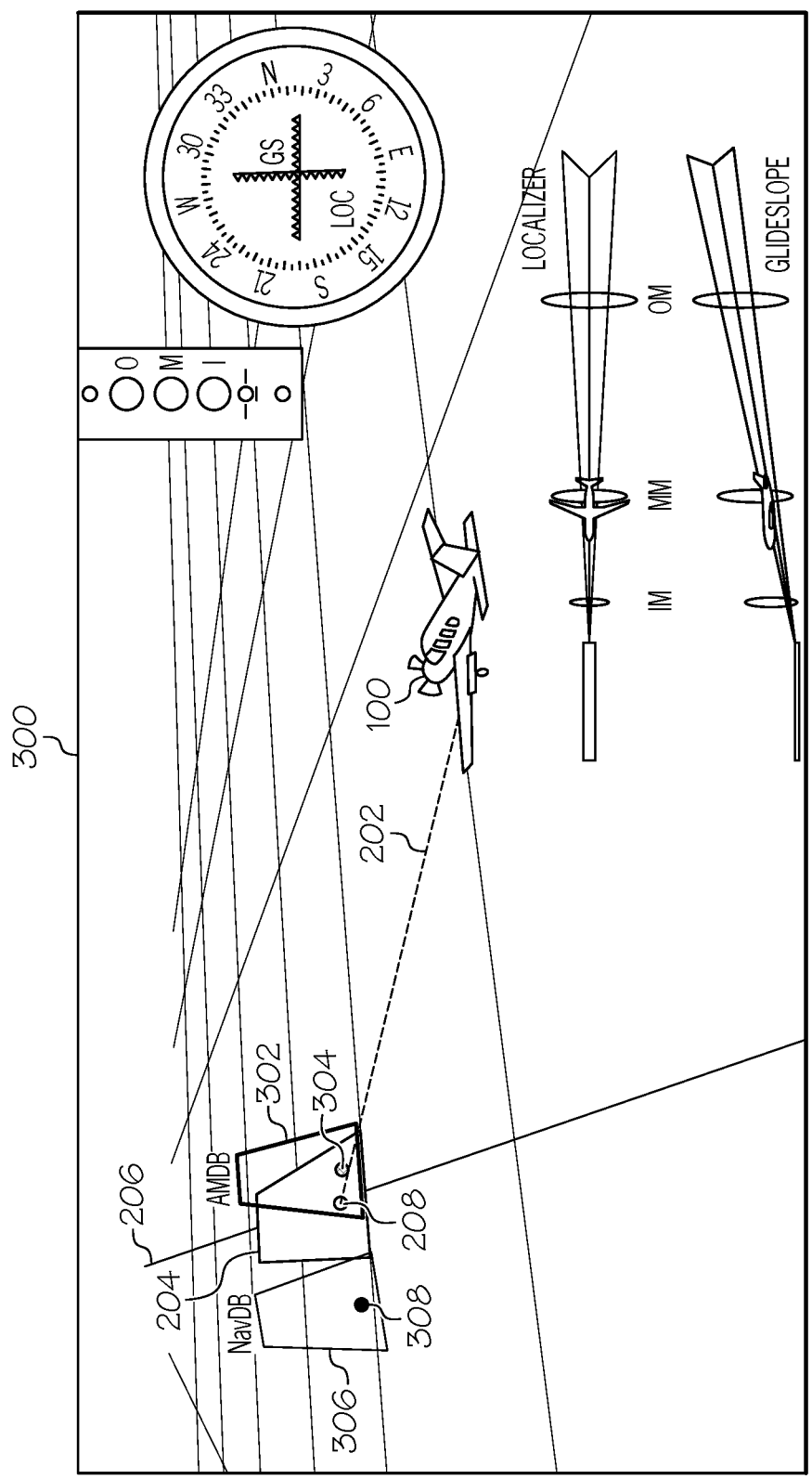
FIG. 3 is an illustration showing rendered SVS runway images based on two different runway records, in accordance with an exemplary embodiment.

The images 28 of FIGS. 2-3 provide non-limiting examples of the provided technological enhancement over other cockpit display systems. The images of FIGS. 2-3 are understood to be based on current aircraft status data for the aircraft 100 and to be dynamically modified responsive to continuously obtaining and processing the current aircraft status data. The images 28 may also be continuously updated to reflect real-time changes with respect to terrain, airport features, weather, and neighbor traffic/relevant traffic.

The aircraft 100 is shown. The aircraft approach slope 202 constructed from the ILS signal is demarked as a dotted line from the aircraft 100 to the target runway 204. The target runway 204 is shown with a runway centerline 206. The intersection between the aircraft approach slope 202 and the runway centerline 206 is demarked as the aiming point 208. A first runway record from a first database provides data and information for a first runway image 302 with first runway threshold 304. A second runway record from a second database provides data and information for a second runway image 306 with second runway threshold 308. In various embodiments, a plurality of runway records including corresponding runway thresholds may be received from one or more database(s) 120.

In operation, system 102 processes the received ILS signal to determine whether the ILS deviation is substantially zero. When it is determined that the ILS deviation is substantially zero, this means it has determined that there is a concurrence of the localizer deviation being substantially zero and the glideslope deviation being substantially zero. When the ILS deviation is substantially zero, the system 102 may: identify an aiming point 208 and receive at least two runway records. In an example, the system 102 may receive the first runway record from the first database and receive a second runway record from the second database. The system 102 determines, for each runway record received, a deviation between the runway threshold and the aiming point 208. In the example, the system 102 determines a first deviation between the aiming point 208 and the first runway threshold 304 and determines a second deviation between the aiming point 208 and the second runway threshold 308. The system 102 selects a most accurate runway record based, at least in part, on which of the corresponding runway thresholds deviates least (e.g., has the smallest absolute value of deviation) from the aiming point 208. Accordingly, the selected most accurate runway record is the runway record having its runway threshold closest to the aiming point 208. The system 102 may then utilize the selected most accurate runway record for rendering images of the target runway 204 on a cockpit display system. In some embodiments, the rendered images of the target runway are SVS images.

The determination of the deviation may include a magnitude and a direction, and these may be determined in various ways. In an embodiment, the deviation may be measured in cartesian coordinates, as one or more of a difference in an X value, a Y value and a Z value between the aiming point 208 and the respective runway threshold (304 and 308). In an embodiment, the deviation may be measured as one or more of a difference in a latitude and a longitude between the aiming point 208 and the respective runway threshold (304 and 308). In embodiments in which there is a plurality of runway records, the system 102 may proceed as follows: for each runway record of the plurality of runway records: generate a respective deviation by calculating an absolute value difference between the aiming point and the runway threshold; and compare the magnitude of the respective deviations to select the most accurate runway record.

Figure 4:
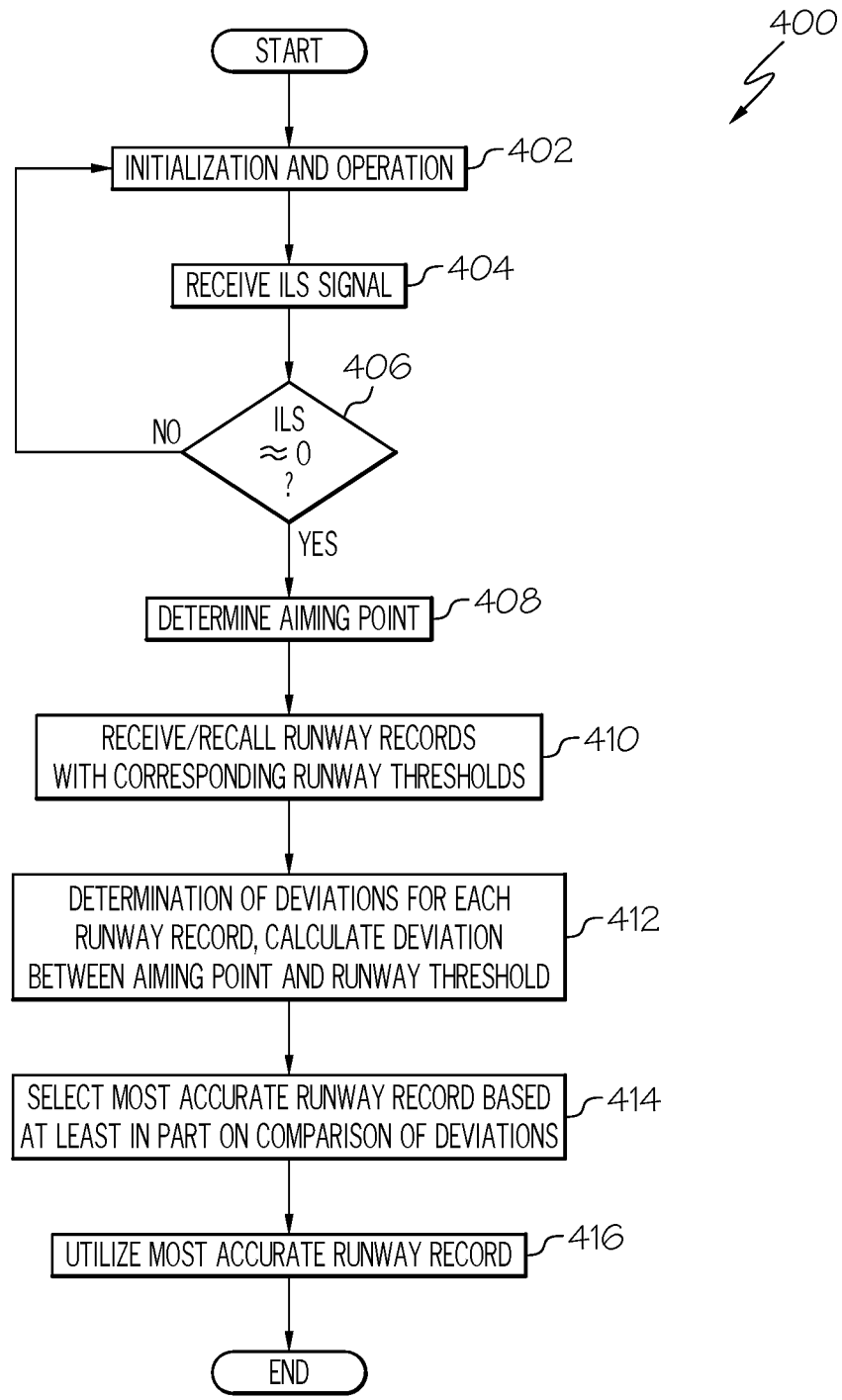
FIG. 4 is a flow chart for a method for providing dynamic readouts for primary flight displays, in accordance with an exemplary embodiment.

The system 102 may make its determinations and selections in accordance with a method such as method 400 of FIG. 4. With continued reference to FIGS. 1-3, a flow chart is provided for a method 400 for providing a system 102, in accordance with various exemplary embodiments. Method 400 represents various embodiments of a method for selecting an accurate runway record. For illustrative purposes, the following description of method 400 may refer to elements mentioned above in connection with FIG. 1. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method starts, and at 402 the control module 104 is initialized and the system 102 is in operation. Initialization may comprise uploading or updating instructions and applications 160, program 162, stored variables 164, and various lookup tables stored in the database 156. Stored variables may include, for example, a configurable delta airspeed, a configurable delta rate-change, predetermined amounts of time to use as time-thresholds, parameters for setting up a user interface, and the various shapes, various colors and/or visually distinguishing techniques used for icons and alerts. In some embodiments, program 162 includes additional instructions and rules for rendering information differently based on type of display device in display system 112. Initialization at 402 may also include identifying external sources 50 and/or external signals and the communication protocols to use with each of them. In operation, the aircraft 100 is understood to be continually receiving and processing navigation data and referencing a prescribed flight plan (FP). In some embodiments, the target runway 204 may be found in the FP. In other embodiments, the target runway 204 is provided via the user input device 114.

At 404, the ILS signal associated with the target runway 204 is received. At 406, the received ILS signal is processed to determine a localizer deviation and a glideslope deviation, as described above; each are compared to zero. As used herein, "substantially zero" deviation means plus or minus five percent. When the ILS signal does not have a substantially zero deviation, the system 102 may continue to process aircraft status data and the ILS signal at 402 or may end. When the ILS signal is substantially zero at 406, the method 400 proceeds to determine the aiming point 208 at 408. The system 102 identifies an intersection of the aircraft approach slope 202 and the runway centerline 206 as the aiming point 208.

At 410 runway records (with their corresponding runway thresholds) for the target runway 204 are received from one or more database(s) 120. If these runway records were previously received, they are recalled at 410. In addition to runway thresholds, information in the runway records includes the boundaries and endpoints from which an associated runway image (e.g., 302 and 306) may be generated.

At 412, deviations are determined as follows: for each runway record received at 410, a deviation between the aiming point and the corresponding runway threshold is calculated. At 414, the most accurate runway record is selected. As described above, the most accurate runway record is selected, at least in part, by comparing the magnitude of the calculated deviations from 412 and determining which of the runway thresholds deviates least from the aiming point. At 414, the proposed selection of the most accurate runway record is completed. At 416, the most accurate runway record may be utilized in rendering an image of the target runway 204 in a cockpit display system, such as by a SVS. After 416, the method may end.

Thus, technologically improved systems and methods for selecting an accurate runway record for use in a cockpit display system are provided. As is readily appreciated, the above examples of the system 102 are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for selecting a runway record for use in a cockpit display system, comprising:
   a transceiver for receiving an Instrument Landing System (ILS) signal for a target runway; and
   a computer system operationally coupled to the transceiver, the computer system configured to:
   process the ILS signal to determine when an ILS deviation is substantially zero; and
   when the ILS deviation is substantially zero,
      identify an aiming point on the target runway;
   receive a first runway record for the target runway from a first on-board database, the first runway record having a first runway threshold;
   receive a second runway record for the target runway from a second on-board database, the second runway record having a second runway threshold;
      determine a first deviation between the aiming point and the first runway threshold;
      determine a second deviation between the aiming point and the second runway threshold;
      select a most accurate runway record, defined as, from among the first and second runway records, the one having a smallest absolute value of deviation between the aiming point and the respective runway threshold;
   and render images, on the cockpit display system, of the target runway using the selected most accurate runway record.

2. The system of claim 1, wherein the ILS signal comprises a localizer and a glideslope, and the ILS deviation is substantially zero upon a concurrence of (i) a localizer deviation being substantially zero and (ii) a glideslope deviation being substantially zero.

3. The system of claim 2, further comprising a synthetic vision system (SVS), and wherein the computer system is further configured to render SVS images of the target runway based on the selected most accurate runway record.

4. The system of claim 3, wherein the aiming point is defined as an intersection between an aircraft approach slope and a runway centerline of the target runway.

5. The system of claim 4, wherein the first database is a navigation database (NavDB) and the second database is an Aerodrome Mapping Database (AMDB).

6. The system of claim 4, wherein the first database is a navigation database (NavDB) and the second database is a Runway Awareness And Advisory System (RAAS).

7. The system of claim 5, wherein the computer system is further configured to:
when the ILS deviation is substantially zero,
receive a third runway record from a third database having therein the third runway record with a third runway threshold;
determine a third deviation between the aiming point and the third runway threshold; and
select the most accurate runway record, further defined as, from among the first, second, and third runway records, the one having a smallest absolute value of deviation between the aiming point and the respective runway threshold.

8. The system of claim 7, wherein the third database is a Runway Awareness And Advisory System (RAAS).

9. A method for selecting a runway record for a target runway, comprising:
at a computer system onboard an aircraft,
receiving an Instrument Landing System (ILS) signal for the target runway;
processing the ILS signal to determine when an ILS deviation is substantially zero; and
when the ILS deviation is substantially zero,
identifying an aiming point on a target runway;
receiving a first runway record for the target runway from a first on-board database, the first runway record having a first runway threshold;
receiving a second runway record for the target runway from a second on-board database, the second runway record having a second runway threshold;
determining a first deviation between the aiming point and the first runway threshold;
determining a second deviation between the aiming point and the second runway threshold;
selecting a most accurate runway record, from among the first and second runway records, defined as the one with a smallest absolute value of deviation between the aiming point and the respective runway threshold; and
rendering images, on the cockpit display system, of the target runway using the selected most accurate runway record.

10. The method of claim 9, wherein the ILS signal comprises a localizer and a glideslope, and the ILS deviation is determined to be substantially zero upon a concurrence of (i) a localizer deviation being substantially zero and (ii) a glideslope deviation being substantially zero.

11. The method of claim 10, further comprising, commanding a synthetic vision system (SVS) to render thereon an image of the target runway based on the selected most accurate runway record.

12. The method of claim 11, wherein the aiming point is defined as an intersection between an aircraft approach slope and a runway centerline of the target runway.

13. The method of claim 12, wherein the first on-board database is a navigation database (NavDB) and the second on-board database is an Aerodrome Mapping Database (AMDB).

14. The method of claim 12, wherein the first on-board database is a navigation database (NavDB) and the second on-board database is a Runway Awareness And Advisory System (RAAS).

15. The method of claim 13, further comprising:
when the ILS deviation is substantially zero,
receiving a third runway record having a corresponding third runway threshold;
determining a third deviation between the aiming point and the third runway threshold; and
selecting the most accurate runway record is further defined as, from among the first, second, and third runway records, the one having a smallest absolute value of deviation between the aiming point and the respective runway threshold.

16. The method of claim 15, wherein the third database is a Runway Awareness And Advisory System (RAAS).

17. An aircraft, comprising:
a transceiver for receiving an Instrument Landing System (ILS) signal for a target runway; and
a computer system operationally coupled to the transceiver, the computer system configured to:
process the ILS signal to determine when an ILS deviation is substantially zero; and
when the ILS deviation is substantially zero,
identify an aiming point on the target runway;
receive a first runway record for the target runway from a first on-board database, the first runway record having a first runway threshold;
receive a second runway record for the target runway from a second on-board database having a second runway record having a second runway threshold;
determine a first deviation between the aiming point and the first runway threshold;
determine a second deviation between the aiming point and the second runway threshold;
select a most accurate runway record from among the first runway record and the second runway record, defined as the one having a smallest absolute value of deviation between the aiming point and the respective runway threshold; and
render images, on the cockpit display system, of the target runway using the selected most accurate runway record.

18. The aircraft of claim 17, further comprising a synthetic vision system (SVS), and wherein the computer system is further configured to render SVS images of the target runway based on the selected most accurate runway record.

19. The aircraft of claim 18, wherein the ILS signal comprises a localizer and a glideslope, and the ILS deviation is substantially zero upon a concurrence of (i) a localizer deviation being substantially zero and (ii) a glideslope deviation being substantially zero.

20. The aircraft of claim 19, wherein the computer system is further configured to:

for each runway record of the plurality of runway records, generate a respective deviation by calculating an absolute value difference between the aiming point and a runway threshold in the respective runway record; and compare the magnitude of the respective deviations.

\* \* \* \* \*